United States Patent
Hoofard et al.

(10) Patent No.: US 9,751,702 B1
(45) Date of Patent: Sep. 5, 2017

(54) WHEEL CHOCK SYSTEMS

(71) Applicant: ASSA ABLOY Entrance Systems AB, Landskrona (SE)

(72) Inventors: Richard K. Hoofard, Dallas, TX (US); Daryl Day, Frisco, TX (US)

(73) Assignee: ASSA ABLOY Entrance Systems, Inc., Landskrona (SE)

( * ) Notice: Subject to any disclaimer, the term of this patent is extended or adjusted under 35 U.S.C. 154(b) by 0 days.

(21) Appl. No.: 15/174,767

(22) Filed: Jun. 6, 2016

(51) Int. Cl.
*B60T 3/00* (2006.01)
*B65G 69/00* (2006.01)

(52) U.S. Cl.
CPC .............. *B65G 69/005* (2013.01); *B60T 3/00* (2013.01); *B65G 2203/042* (2013.01)

(58) Field of Classification Search
CPC ....... B60T 3/00; B65G 69/003; B65G 69/006; B65G 2203/0412; B65G 2203/044; B65G 69/005; B60P 3/077
See application file for complete search history.

(56) References Cited

U.S. PATENT DOCUMENTS

| | | | |
|---|---|---|---|
| 2,801,011 | A | 7/1957 | Overlach et al. |
| 3,305,049 | A | 2/1967 | Willey |
| 4,207,019 | A | 6/1980 | Cone |
| 4,208,161 | A | 6/1980 | Hipp et al. |
| 4,264,259 | A | 4/1981 | Hipp et al. |
| 4,282,621 | A | 8/1981 | Anthony et al. |
| 4,400,127 | A | 8/1983 | Metz |

(Continued)

FOREIGN PATENT DOCUMENTS

| | | |
|---|---|---|
| CA | 2234974 | 10/1999 |
| CA | 2297384 | 2/2001 |

(Continued)

OTHER PUBLICATIONS

Electronic translation of EP 2944522 A1.*

(Continued)

*Primary Examiner* — Anna Momper
(74) *Attorney, Agent, or Firm* — Perkins Coie LLP

(57) ABSTRACT

Wheel chock systems for use at loading docks and other locations are described herein. In some embodiments, the wheel chock systems can include a wheel chock assembly that is positionable in contact with a vehicle wheel to restrain the vehicle at a loading dock. The wheel chock assembly can include a sensor target, and a corresponding sensor can be mounted to, for example, an outer wall of the loading dock or a wheel chock storage cradle mounted to the outer wall. In operation, the sensor can emit a wireless signal (e.g., an electromagnetic signal) that is reflected off of the sensor target and received back by the sensor when the wheel chock has been positioned in a blocking relationship relative to the vehicle wheel to restrain the vehicle at the loading dock. The sensor can be operably connected to a loading dock signal system (e.g., a signal light system) that displays appropriate signals to loading dock personnel based on detection of proper wheel chock placement. In other embodiments, wheel chock systems can include other types of devices for wirelessly communicating wheel chock placement information to loading dock systems. Such device types can include, for example, Bluetooth, Wi-Fi, RFID, etc.

20 Claims, 11 Drawing Sheets

(56) References Cited

U.S. PATENT DOCUMENTS

| | | |
|---|---|---|
| 4,443,150 A | 4/1984 | Hahn et al. |
| 4,472,099 A | 9/1984 | Hahn et al. |
| 4,555,211 A | 11/1985 | Metz |
| 4,560,315 A | 12/1985 | Hahn |
| 4,605,353 A | 8/1986 | Hahn et al. |
| 4,634,334 A | 1/1987 | Hahn et al. |
| 4,664,582 A | 5/1987 | Edmeads et al. |
| 4,674,941 A | 6/1987 | Hageman et al. |
| 4,679,974 A | 7/1987 | Blunden |
| 4,692,755 A * | 9/1987 | Hahn ................. B65G 69/003 340/687 |
| 4,695,216 A | 9/1987 | Erlandsson et al. |
| 4,784,567 A | 11/1988 | Hageman et al. |
| 4,815,918 A | 3/1989 | Bennett et al. |
| RE32,968 E | 6/1989 | Hahn |
| 4,861,217 A | 8/1989 | Eelandsson |
| 4,865,508 A | 9/1989 | Carlson et al. |
| 4,938,647 A | 7/1990 | Erlandsson et al. |
| 4,969,792 A | 11/1990 | Ellis et al. |
| 4,973,213 A | 11/1990 | Erlandsson et al. |
| 4,988,254 A | 1/1991 | Alexander |
| 5,026,242 A | 6/1991 | Alexander |
| 5,071,306 A | 12/1991 | Alexander |
| 5,096,359 A | 3/1992 | Alexander |
| 5,120,181 A | 6/1992 | Alexander |
| 5,212,846 A | 5/1993 | Hahn et al. |
| 5,249,905 A | 10/1993 | Warner et al. |
| 5,259,718 A | 11/1993 | Alexander |
| 5,297,921 A | 3/1994 | Springer et al. |
| 5,336,033 A | 8/1994 | Alexander |
| 5,346,353 A | 9/1994 | Alexander |
| 5,375,965 A | 12/1994 | Springer et al. |
| 5,454,682 A | 10/1995 | Alexander |
| 5,505,575 A | 4/1996 | Alexander |
| 5,531,557 A | 7/1996 | Springer |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles et al. |
| 5,709,518 A | 1/1998 | Alexander et al. |
| 5,743,697 A | 4/1998 | Alexander |
| 5,762,459 A | 6/1998 | Springer et al. |
| 5,896,957 A | 4/1999 | Berends et al. |
| 5,927,928 A | 7/1999 | Hageman et al. |
| 5,934,857 A | 8/1999 | Alexander |
| 5,964,572 A | 10/1999 | Hahn et al. |
| 6,062,796 A | 5/2000 | Alexander |
| 6,082,952 A | 7/2000 | Alexander |
| 6,092,970 A | 7/2000 | Hahn et al. |
| 6,123,496 A | 9/2000 | Alexander |
| 6,238,163 B1 | 5/2001 | Springer et al. |
| 6,250,432 B1 | 6/2001 | Hageman et al. |
| 6,276,496 B1 | 8/2001 | Hageman et al. |
| 6,322,311 B1 | 11/2001 | Alexander et al. |
| 6,336,527 B1 * | 1/2002 | Metz ................. B60T 3/00 188/32 |
| RE37,570 E | 3/2002 | Springer et al. |
| 6,357,987 B1 | 3/2002 | Palus |
| 6,368,043 B1 | 4/2002 | Leum et al. |
| 6,371,253 B1 | 4/2002 | Berends et al. |
| 6,390,245 B1 | 5/2002 | Metz et al. |
| 6,478,525 B2 | 11/2002 | Hageman et al. |
| 6,505,713 B1 | 1/2003 | Paul et al. |
| 6,524,053 B2 | 2/2003 | Hahn et al. |
| 6,589,003 B2 | 7/2003 | Berends |
| 6,676,360 B2 | 1/2004 | Springer et al. |
| 6,690,287 B2 | 2/2004 | Jette et al. |
| 7,032,720 B2 | 4/2006 | Jette et al. |
| 7,226,265 B2 | 6/2007 | Wilson |
| 7,264,092 B2 | 9/2007 | Jette |
| 7,864,030 B2 | 1/2011 | Jetté et al. |
| 8,286,757 B2 | 10/2012 | Nelson et al. |
| 8,287,223 B2 | 10/2012 | Andersen et al. |
| 8,307,956 B2 | 11/2012 | Andersen et al. |
| 8,465,245 B2 * | 6/2013 | Manone ................. B65G 69/005 188/32 |
| 8,499,897 B2 | 8/2013 | Brooks et al. |
| 8,590,674 B2 * | 11/2013 | Jette ................. B60T 3/00 188/32 |
| 8,596,949 B2 | 12/2013 | Harrington |
| 8,678,736 B2 | 3/2014 | Andersen et al. |
| 8,905,198 B2 | 12/2014 | Cotton et al. |
| 9,126,775 B2 | 9/2015 | Brooks et al. |
| 9,139,384 B2 | 9/2015 | Brooks, IV et al. |
| 9,145,273 B2 | 9/2015 | Brooks et al. |
| 2002/0136620 A1 | 9/2002 | Berends |
| 2002/0141852 A1 | 10/2002 | Hahn et al. |
| 2003/0159892 A1 | 8/2003 | Jette |
| 2003/0170097 A1 | 9/2003 | Pedersen et al. |
| 2004/0005210 A1 | 1/2004 | Alexander et al. |
| 2005/0133315 A1 | 6/2005 | Hoofard |
| 2005/0226705 A1 * | 10/2005 | Wilson ................. B60T 3/00 414/401 |
| 2006/0051196 A1 | 3/2006 | McDonald |
| 2006/0144649 A1 | 7/2006 | Jette |
| 2006/0182559 A1 | 8/2006 | Gleason et al. |
| 2007/0248440 A1 | 10/2007 | Andersen et al. |
| 2008/0124203 A1 | 5/2008 | McDonald |
| 2009/0026022 A1 * | 1/2009 | Andersen ............. B65G 69/005 188/32 |
| 2009/0155030 A1 | 6/2009 | Andersen et al. |
| 2009/0194375 A1 | 8/2009 | Andersen et al. |
| 2009/0194376 A1 | 8/2009 | Brooks et al. |
| 2009/0223764 A1 | 9/2009 | Andersen et al. |
| 2010/0260585 A1 | 10/2010 | Sander et al. |
| 2010/0260586 A1 | 10/2010 | Manone et al. |
| 2011/0158778 A1 | 6/2011 | Harrington et al. |
| 2011/0162916 A1 | 7/2011 | Salinger et al. |
| 2011/0176896 A1 | 7/2011 | Andersen et al. |
| 2011/0226565 A1 * | 9/2011 | Jette ................. B60T 3/00 188/32 |
| 2011/0240416 A1 * | 10/2011 | Brooks ................. B60T 3/00 188/32 |
| 2011/0290596 A1 * | 12/2011 | Perkins ................. B65G 69/005 188/32 |
| 2012/0006632 A1 * | 1/2012 | Nelson ................. B60T 3/00 188/32 |
| 2013/0223048 A1 * | 8/2013 | Jeong ................. B60P 3/077 362/183 |
| 2013/0292214 A1 | 11/2013 | Brooks et al. |
| 2014/0255134 A1 | 9/2014 | Brooks, IV et al. |
| 2015/0191319 A1 | 7/2015 | Muhl et al. |
| 2015/0239686 A1 | 8/2015 | Stone et al. |
| 2016/0090072 A1 * | 3/2016 | Metz ................. B60T 17/22 188/1.11 E |
| 2017/0008498 A1 * | 1/2017 | Metz ................. B60T 3/00 |

FOREIGN PATENT DOCUMENTS

| | | | |
|---|---|---|---|
| DE | 4120035 | 12/1992 | |
| DE | 4427406 | 10/1995 | |
| DE | EP 2944522 A1 * | 11/2015 | ............... B60T 3/00 |
| EP | 0452519 | 10/1991 | |
| EP | 0609049 | 8/1994 | |
| EP | 0684915 | 12/1995 | |
| EP | 0775653 | 5/1997 | |
| EP | 1112950 | 7/2001 | |
| EP | 1764275 | 3/2007 | |
| EP | 2170663 | 4/2010 | |
| EP | 2796395 A1 | 10/2014 | |
| FR | 2736336 | 1/1997 | |
| FR | EP 2292481 A1 * | 3/2011 | ............... B60T 3/00 |
| WO | 9518029 | 7/1995 | |
| WO | 9935067 | 7/1999 | |
| WO | 2004078618 | 9/2004 | |
| WO | 2009032372 | 3/2009 | |
| WO | 2009100146 | 8/2009 | |
| WO | 2009111244 | 9/2009 | |
| WO | 20090139946 | 11/2009 | |
| WO | 2010090884 | 8/2010 | |

(56) References Cited

FOREIGN PATENT DOCUMENTS

| WO | 2010118032 | 10/2010 |
| WO | 2014137874 A1 | 9/2014 |
| WO | 2015077893 A1 | 6/2015 |

OTHER PUBLICATIONS

Automatic Wheel Restraint Surface Mounted User's Manual, Apr. 2006, SPX Dock Products, Inc., 44 pages.
Vehicle Restraints, Safety Chock Series SLSC 2000, Users Manual, Sep. 1999, SERCO, 32 pages.

* cited by examiner

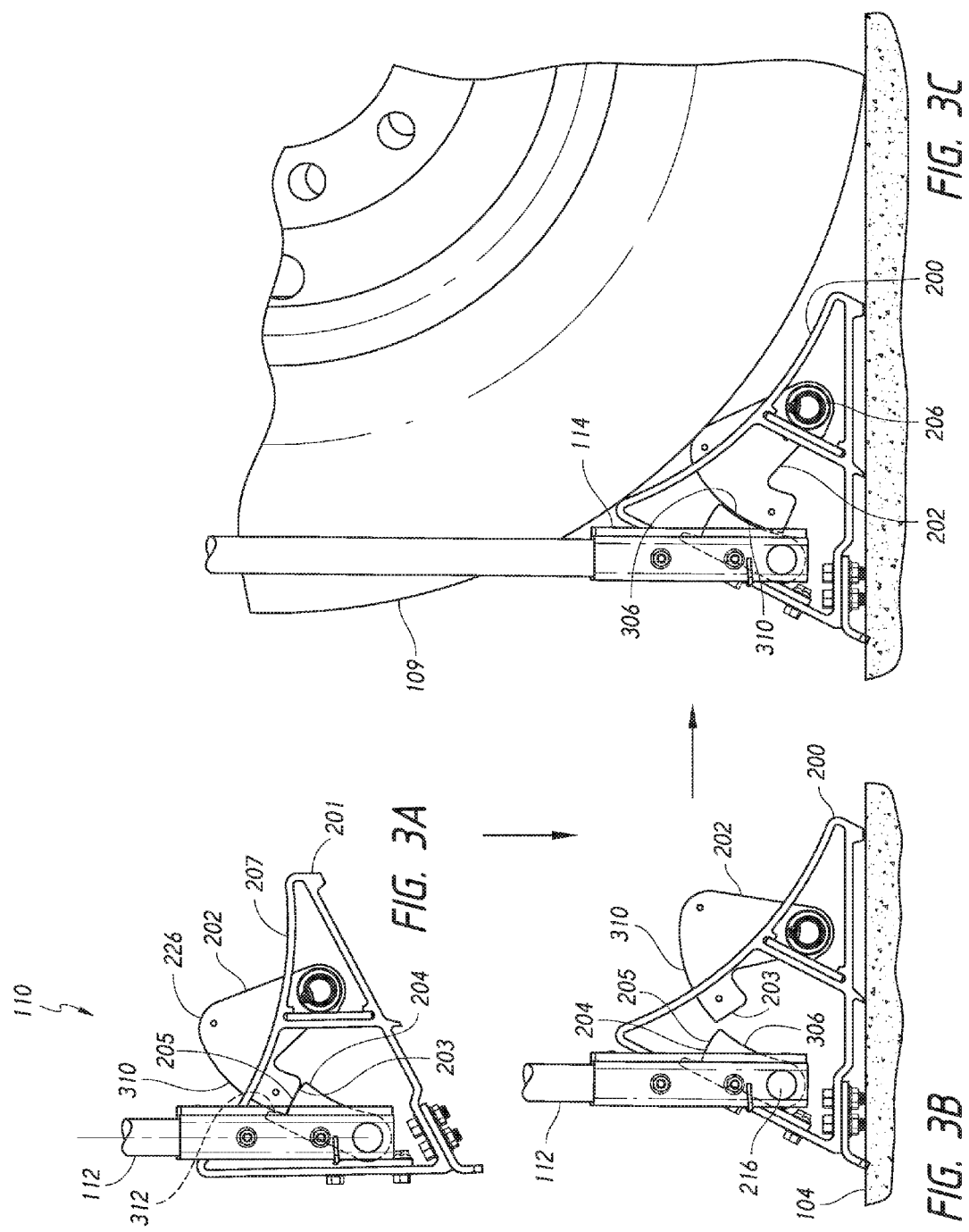

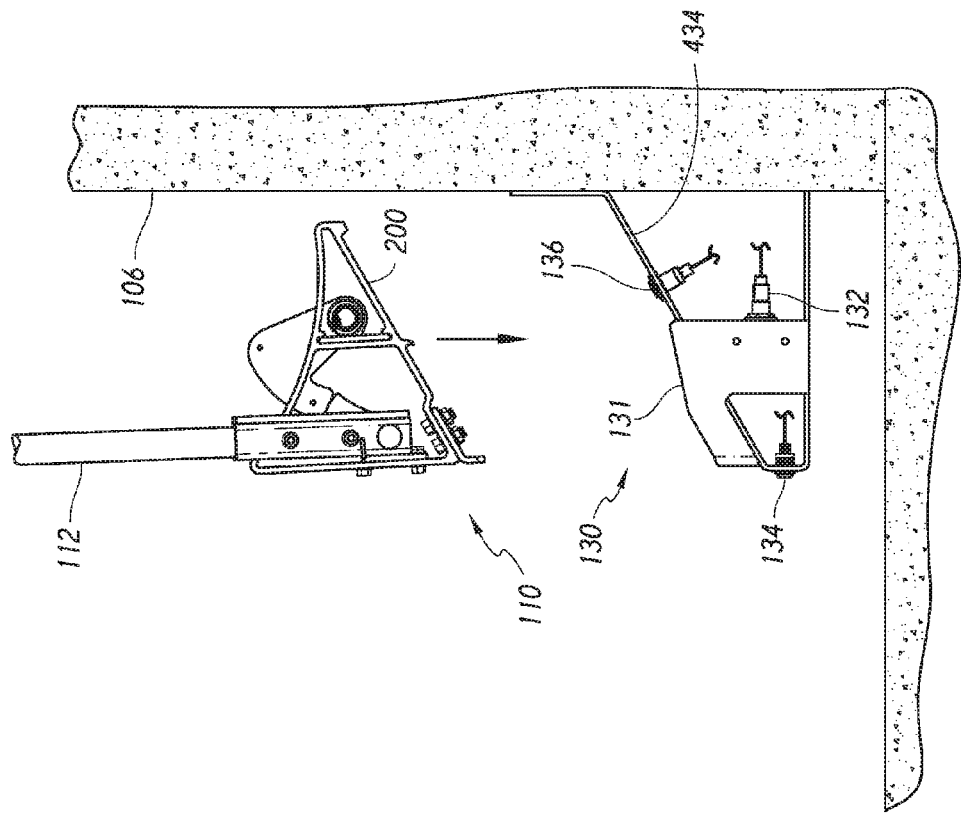
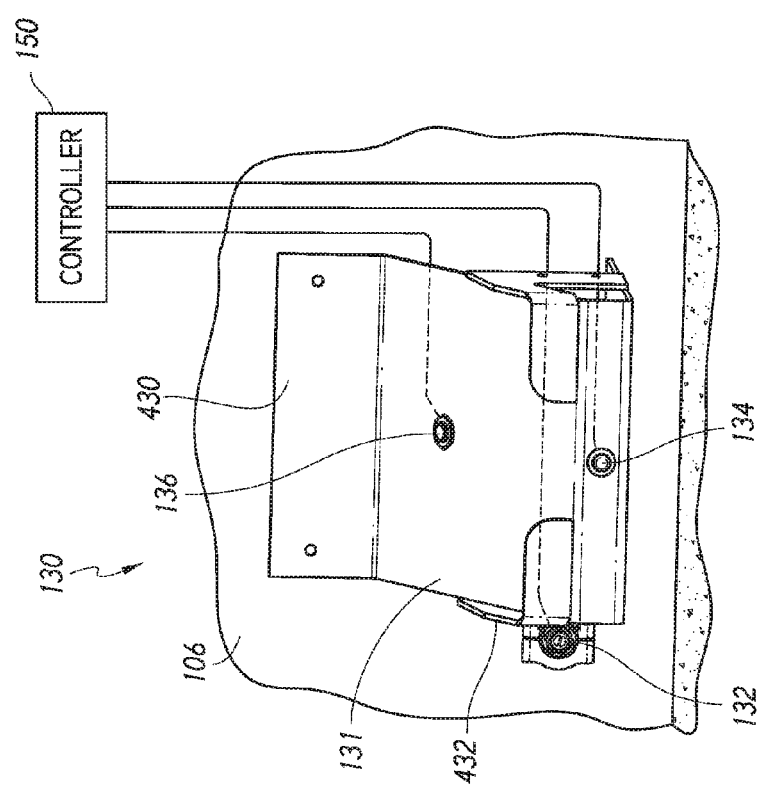
FIG. 4A
FIG. 4B

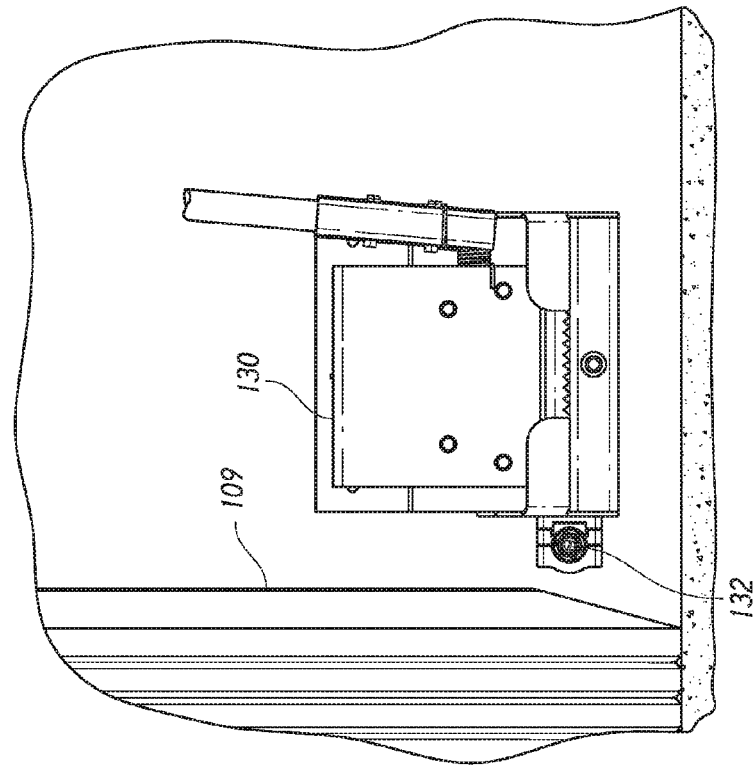
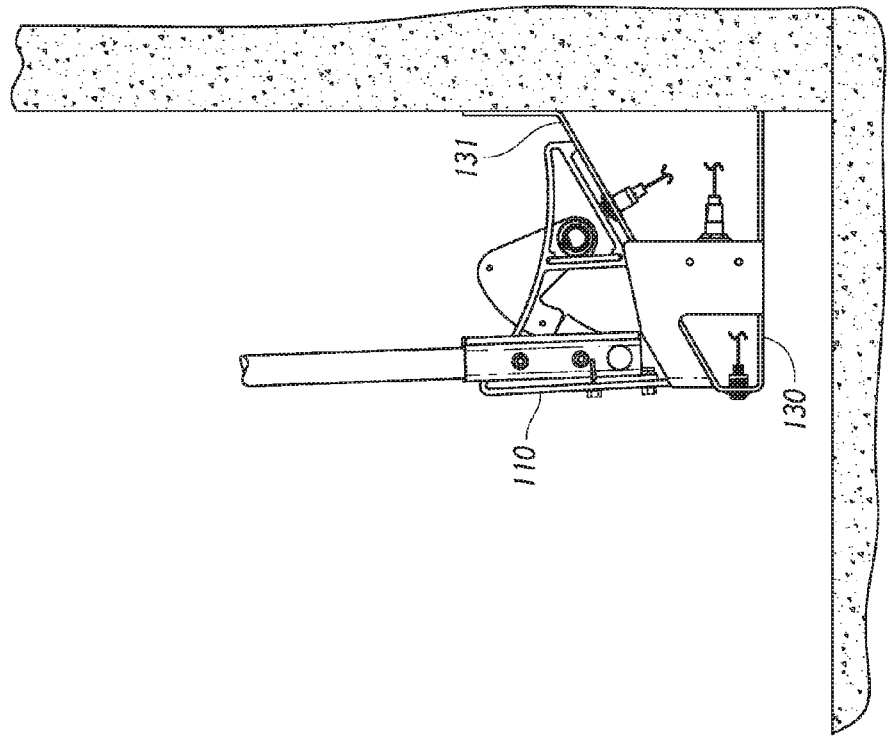
FIG. 4D
FIG. 4C

WHEEL CHOCK SYSTEMS

TECHNICAL FIELD

The following disclosure relates generally to wheel chocks and, more specifically, to wireless wheel chock systems and associated methods for restraining shipping vehicles at loading docks.

BACKGROUND

Conventional loading docks typically include an elevated opening in the side of a warehouse or other building. The opening is generally covered by a door when the loading dock is not in use. To load or unload a trailer or other shipping vehicle, the doors on the back of the trailer are opened and the vehicle is backed up to the loading dock door. Once in position, a vehicle restraint is typically employed to keep the vehicle from inadvertently moving away from the loading dock during the loading and/or unloading process. The loading dock door is then raised, and a dock leveler is extended into the trailer so that workers, forklifts, etc. can transfer cargo into and/or out of the trailer over the dock leveler. Once the loading/unloading process is complete, the dock leveler is retracted and the loading dock door is lowered. The vehicle restraint is then removed so that the trailer can depart the loading dock.

Various types of vehicle restraints are used in the material handling industry to prevent vehicles from moving away from loading docks during loading and/or unloading. Such devices include mechanical restraints that are anchored to the dock face or driveway and include a mechanical hook that can be raised to engage the Rear Impact Guard ("RIG") bar of the vehicle. Other loading docks employ wheel chocks for vehicle restraint. The use of wheel chocks to block vehicle movement is old and well known in the art. Conventional wheel chocks, for example, have a substantially triangular cross-sectional shape with a curved surface configured to fit against a wheel and prevent movement of the wheel in the direction of the wheel chock. Wheel chock systems are disclosed in U.S. Pat. Nos. 8,590,674, 8,307, 956, 8,286,757, 7,864,030, 7,264,092, 7,032,720, and 6,390, 245, each of which is incorporated herein by reference in its entirety.

The Smart Chock™ restraint system provided by DL Manufacturing of 340 Gateway Park Drive, North Syracuse, N.Y. 13212, includes a wheel chock having a sensor to detect when the wheel chock has been properly placed in a blocking relationship to the vehicle wheel. The sensor is connected to the loading dock by an electrical cable, so that the sensor can receive power from a loading dock power source and communicate placement signals to a light assembly mounted adjacent to the loading dock. Similar wheel chock systems are described in, for example, U.S. Pat. Nos. 6,336,527, and 7,226,265, and U.S. patent application Ser. No. 10/798,708, each of which is also incorporated herein by reference in its entirety. One shortcoming of these wheel chock systems is that the cable and supporting structure extending between the wheel chock and the loading dock can make placement of the wheel chock cumbersome. Additionally, wear and tear from normal use can lead to frequent service or replacement of the cable and supporting structure. Accordingly, it would be advantageous to provide a wheel chock system that overcame the shortcomings of prior art systems.

BRIEF DESCRIPTION OF THE DRAWINGS

FIGS. 3A-3C are a series of side views of the wheel chock assembly of FIG. 2 in a storage position, a transport position, and a fully installed position blocking a vehicle wheel, respectively, in accordance with an embodiment of the present technology.

FIG. 4A is partially schematic front isometric view of a wheel chock storage cradle configured in accordance with an embodiment of the present technology, FIGS. 4B and 4C are side elevation views illustrating two stages of storing the wheel chock assembly of FIG. 2 in the storage cradle of FIG. 4A, and FIG. 4D is a front elevation view of the wheel chock assembly stored in the storage cradle.

DETAILED DESCRIPTION

Figure 1A:
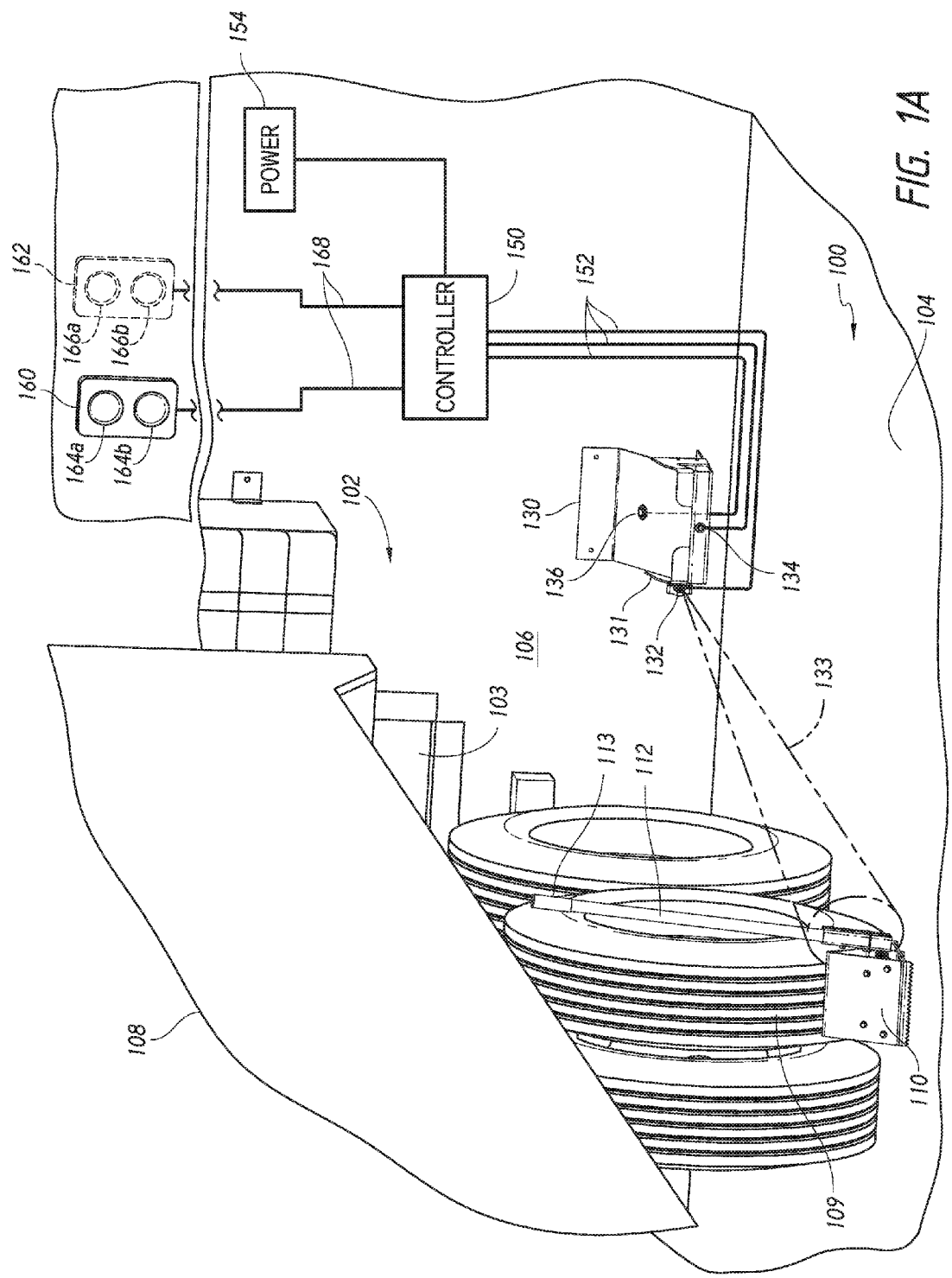
FIG. 1A is a partially schematic front isometric view of a wheel chock system configured in accordance with an embodiment of the present technology.

The following disclosure describes various embodiments of wheel chock systems that include means for detecting whether or not the wheel chock has been properly positioned in a blocking relationship relative to a vehicle wheel, such as a rear wheel of a trailer or other shipping vehicle parked at a loading dock. In contrast to prior art systems, embodiments of the present disclosure include sensing systems that can wirelessly detect whether or not the wheel chock has been properly positioned relative to the vehicle wheel, without the need for cables, cable supports, and other structures for electrically connecting the wheel chock to power systems, microcontrollers, and/or other systems located adjacent to the loading dock door. For example, in some embodiments the wheel chock systems described herein can include a wheel chock having a reflective sensor target mounted to, for example, an operating handle of the wheel chock. In these embodiments, a corresponding sensor (e.g., a retroflective optical sensor having both a light emitter and a light receiver) can be mounted on or proximate to the dock face adjacent the vehicle parking space. In operation, the sensor can emit a light beam that is reflected off of the sensor target and received back by the sensor only when the wheel chock has been properly positioned in front of the vehicle wheel to restrain the vehicle at the loading dock. When the sensor receives the light signal indicating proper wheel chock placement, the sensor sends a corresponding signal to a controller that in turn energizes a one or more signals (e.g., light signals) to indicate to the vehicle driver and/or other dock personnel that the vehicle has been properly restrained at the loading dock. In other embodiments, other types of sensor systems capable of wirelessly detecting proper placement of the wheel chock can be used. For example, in some embodiments wheel chocks configured in accordance with the present technology can include a wireless transmitting device (e.g., an electromagnetic transmitting device, radio frequency transmitting device, etc.) that wirelessly communicates with a corresponding receiver mounted on or proximate to the dock face when the wheel chock has been properly positioned against a vehicle wheel to restrain the vehicle at the loading dock.

Certain details are set forth in the following description and in FIGS. 1A-8 to provide a thorough understanding of various embodiments of the present technology. In other instances, well-known structures, materials, operations and/or systems often associated with wheel chocks, loading docks, sensor systems, wireless communication systems, processing devices, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles, and other features shown in the Figures are merely illustrative of particular embodiments of the disclosure. Accordingly, other embodiments can have other details, dimensions, angles, and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
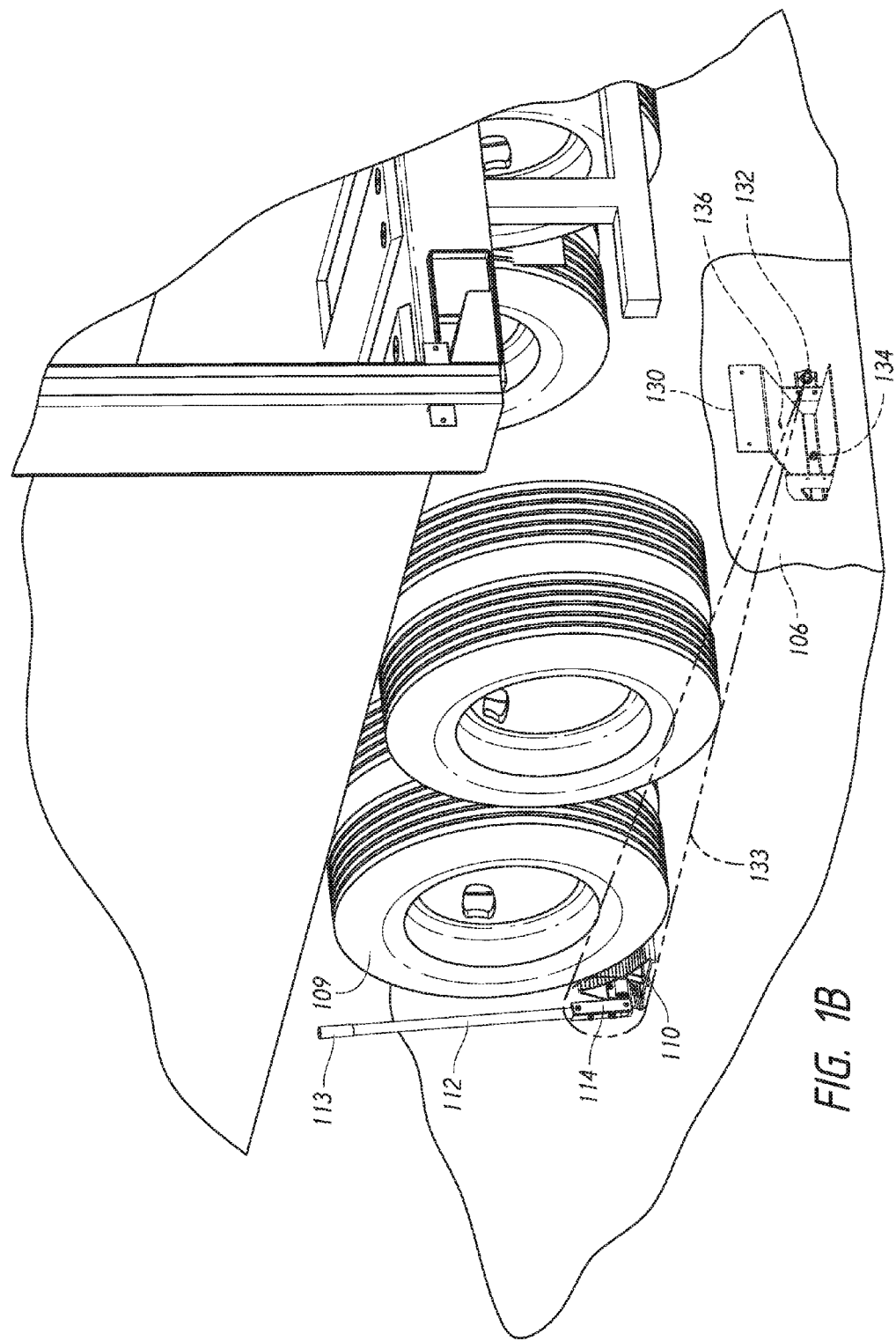
FIGS. 1B and 1C are rear isometric and front elevation views, respectively, of the wheel chock system.
Figure 1C:
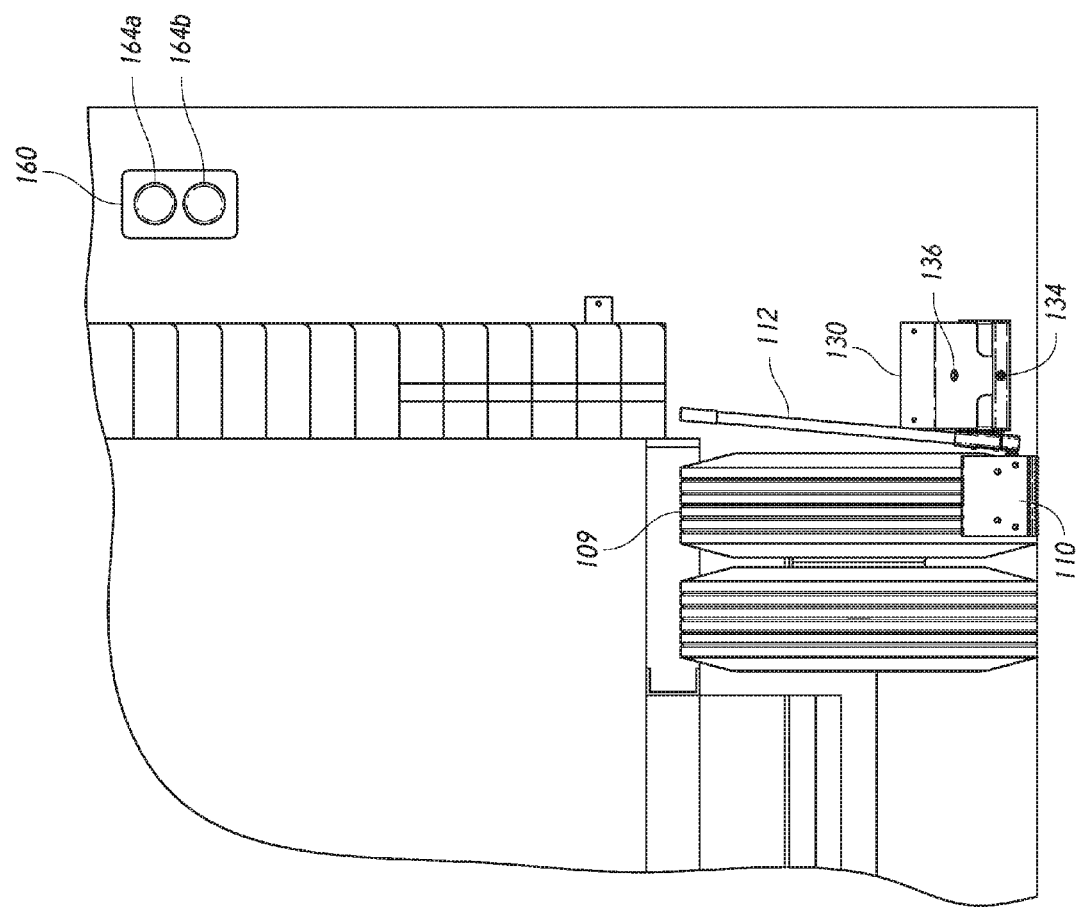

FIG. 1A is a partially schematic front isometric view of a wheel chock system 100 configured in accordance with an embodiment of the present technology, and FIGS. 1B and 1C are rear isometric and front elevation views, respectively, of the wheel chock system 100. Referring to FIGS. 1A-1C together, in the illustrated embodiment the wheel chock system 100 is installed at a loading dock 102 having a driveway 104 in front of a loading dock opening 103. The wheel chock system 100 includes a wheel chock assembly 110 operably positioned on the driveway 104, and a corresponding base unit 130 mounted to a dock face 106 adjacent to the loading dock opening 103. The wheel chock assembly 110 can include a rotatable handle 112 having a grip portion 113 that a vehicle driver or other dock personnel can grip to manually position the wheel chock assembly 110 in front of and against a vehicle wheel 109 (e.g., a forward one of a rear wheel assembly) of a vehicle 108 (e.g., a conventional shipping trailer) to restrain the shipping vehicle 108 at the loading dock opening 103. As shown in FIG. 1B, in the illustrated embodiment a sensor target 114 is mounted to a lower portion of the handle 112 so that it can face the loading dock face 106 (e.g., is parallel to the dock face 106) when the handle 112 is rotated to a vertical position. The base unit 130 includes a storage cradle 131 for receiving and storing the wheel chock assembly 110 when not in use.

In the illustrated embodiment, the base unit 130 includes a base sensor 132 configured to wirelessly interact with the sensor target 114 to confirm that the wheel chock assembly 110 has been properly placed in contact with the vehicle wheel 109. For example, the sensor 132 can be an optical or electro-optical sensor, such as a retroflective photoelectric sensor having both a light emitter that emits a light beam 133 (e.g., infrared light), and a receiver that receives the light beam 133 (or a portion thereof) when it is reflected back to the sensor 132 by the sensor target 114. One such sensor is the QS30 LP/LV EURO QD sensor provided by Banner Engineering Corp., P.O. Box 9414, Minneapolis, Minn. 55440. In other embodiments, other types of sensor systems (including other types of photoelectric sensors, such as through-beam and diffuse sensors) can be used for the sensor 132 and/or other portions of the wheel chock system 100 described herein. In some embodiments, the sensor 132 can have an operating range of, for example, up to about 36 feet, or up to about 24 feet. The sensor target 114 can include a reflective surface (e.g., a reflective acrylic surface having a reflectivity factor of, for example, 1.4) that is configured to reflect the light beam 133. In this embodiment, the sensor 132 is positioned to emit the light beam 133 at a perpendicular angle (i.e., a 90-degree angle, or at least approximately a 90-degree angle), relative to the dock face 106. Additionally, the sensor 132 is laterally and vertically aligned (or at least approximately laterally and vertically aligned) with the handle 112 as shown in FIG. 1C so that the light beam 133 will be reflected off of the sensor target 114 and received by the sensor 132 only when the vehicle 108 is properly positioned in front of the loading dock opening 103 and the wheel chock assembly 110 has been properly positioned in front of the vehicle wheel 109. In other embodiments, other types of wireless communication systems, including other types of optical communication systems, radio frequency (RF) communication systems, etc. can be used to wirelessly communicate information between the wheel chock assembly 110 and the base unit 130 (and/or other portions of the loading dock 102).

In another aspect of this embodiment, the base unit 130 can include an indicator light 134 (e.g., a "mimic light") that is directed outwardly from the dock face 106, and a storage sensor 136 positioned on an inner surface of the storage cradle 131. In some embodiments, the indicator light 134 can be an LED light having, for example, a yellow-colored lens for displaying yellow light when the sensor 132 has detected proper placement of the wheel chock assembly 110. Suitable indicator lights include the EZ-Light® S22 high intensity, dc-operated LED indicator light provided by Banner Engineering Corp., P.O. Box 9414, Minneapolis, Minn. 55440. In other embodiments, however, other suitable indicator lights can be used; and in some embodiments, the indicator light 134 can be omitted. As described in greater detail below, in the illustrated embodiment the storage sensor 136 can be a suitable proximity sensor, such as an inductive proximity sensor that can detect the presence of the wheel chock assembly 110 when the wheel chock assembly 110 has been properly stored in the storage cradle 131. For example, in some embodiments the storage sensor 136 can be an inductive proximity sensor, such as sensor part number B1 5-G18K-AP6X-H1141, provided by Turck Inc., of 3000 Campus Drive, Minneapolis, Minn. 55441. In other embodiments, other types of proximity sensors and/or other devices can be used to detect the presence of the wheel chock assembly 110 in the storage cradle 131. In yet other embodiments, the storage sensor 136 can be omitted.

In the illustrated embodiment, the sensor 132, the indicator light 134, and the storage sensor 136 are connected via electrical links 152 (e.g., wires) to a controller 150. In the illustrated embodiment, the controller 150 is also operably connected to an outside signal light assembly 160 and an inside signal light assembly 162 via associated electrical links 168 (e.g., wires). The outside signal light assembly 160 can include a first signal light 164a (e.g., a red light, such as a red LED light) and a second signal light 164b (e.g., a green light, such as a green LED light). Similarly, the inside signal light assembly 162 can include a first signal light 166a (e.g., a red light) and a second signal light 166b (e.g., a green light). Additionally, the controller 150 can be operably connected to an electrical power source 154 (e.g., facility power, a battery, etc.) to receive power for operating the various sensors, lights, and processing devices described in detail herein. The controller 150 can include one or more processing devices, such as a microcontroller or Programmable Logic Controller (PLC), configured to provide power to, and/or exchange operating signals and commands with, the sensor 132, the indicator light 134, the storage sensor 136, and/or the inside and outside signal light assemblies 162 and 160 in accordance with computer-readable instructions stored on associated memory. Although shown schematically, those of ordinary skill in the art will understand that the controller 150 can be mounted in a suitable location proximate to (e.g., inside) the loading dock 102, for example, adjacent to the loading dock opening 130.

Figure 2:
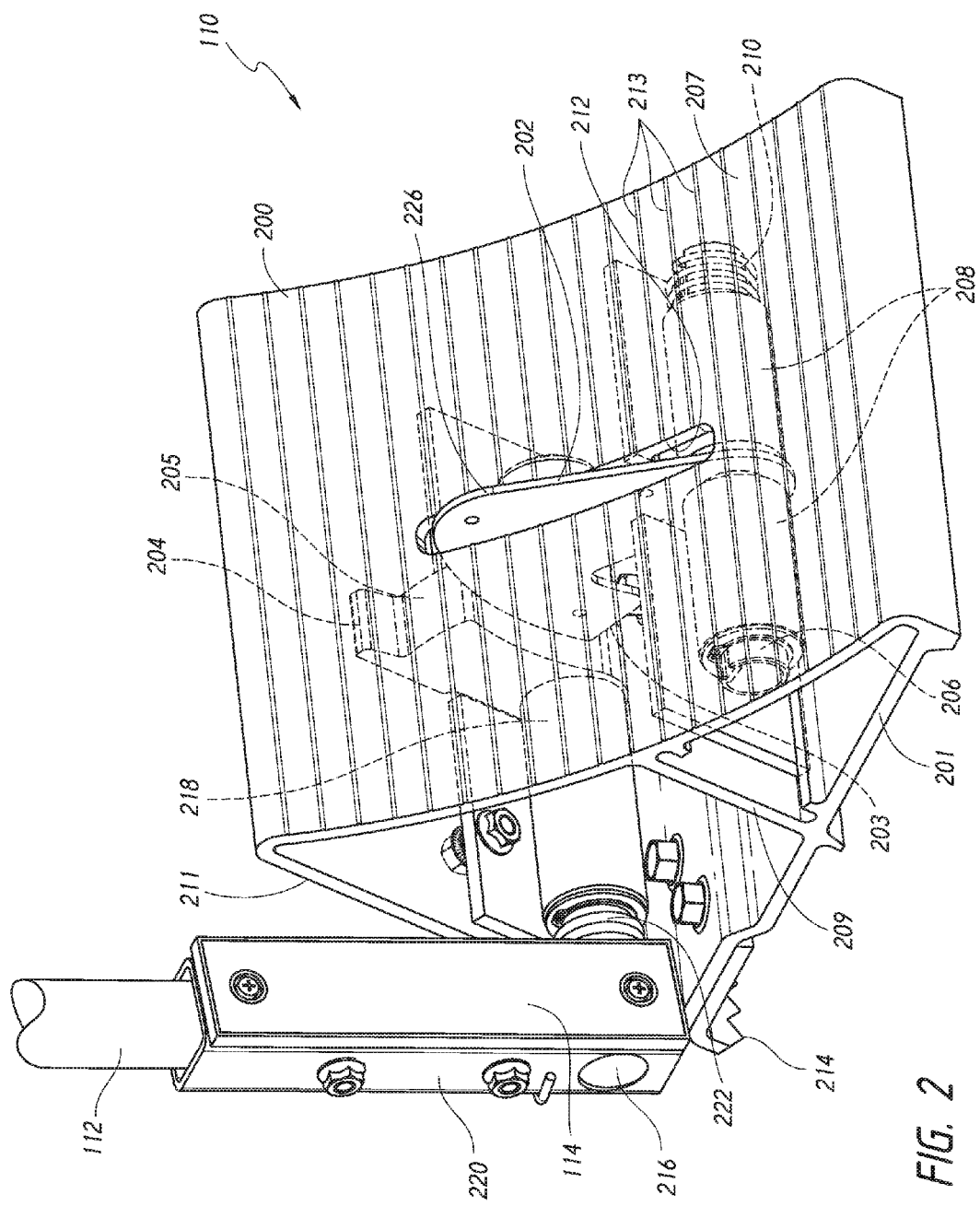
FIG. 2 is an isometric view of a wheel chock assembly configured in accordance with an embodiment of the present technology.

FIG. 2 is an isometric view of the wheel chock assembly 110 configured in accordance with an embodiment of the present technology. In the illustrated embodiment, the wheel chock assembly 110 includes a wheel chock 200 having a chock body 201. The chock body 201 includes an inwardly-curved blocking surface 207 having a radius of curvature that is approximately equivalent, or at least generally similar, to the outside diameter of the vehicle wheel 109 (FIG. 1). The blocking surface 207 can include a plurality of transverse, raised ridges 213 or other surface features to enhance grip between the blocking surface 207 and the vehicle wheel 109. In some embodiments, the chock body 201 can be formed from a suitable extrusion, such as an aluminum extrusion. In other embodiments, the chock body 201 can be formed from other suitable materials, including other suitable extrusions (e.g., steel extrusions), as well as other metallic and/or non-metallic parts that are bolted or otherwise fastened together. Such parts can be formed from, for example, aluminum, steel, plastic, rubber, and/or composite materials. In addition to the foregoing features, the wheel chock 200 can further include an anchor plate 214 fixed to a lower leading edge of the chock body 201. The anchor plate 214 can include a downward-turned lip portion having, for example, serrations or other features to facilitate gripping a parking surface (e.g., the driveway 104 of FIG. 1A) and preventing forward movement when the vehicle wheel 109 pushes against the wheel chock 200.

The wheel chock 200 further includes a wheel trigger 202 having a wheel contact surface portion 226 configured to rotatably protrude through an opening 212 in the blocking surface 207. The wheel trigger 202 is fixedly coupled to a pivot shaft 206 that is rotatably received in opposing pivot sleeves 208, which are fixedly attached to a web 209 of the chock body 201. A biasing member 210 (e.g., a helical torsion spring that extends around the pivot shaft 206) is operably coupled between the pivot shaft 206 and the web 209. The biasing member 210 is preloaded to torsionally bias the pivot shaft 206 (and hence the wheel trigger 202) upwardly through the opening 212 to the protruding position shown in FIG. 2. Although not shown in FIG. 2, the wheel trigger 202 includes a stop feature (e.g., an abutting surface) that contacts a portion of the chock body 201 and prevents the wheel trigger 202 from rotating outwardly beyond the protruding position shown in FIG. 2. As described in greater detail below, when the wheel chock 200 is positioned against the vehicle wheel 109 (FIG. 1A), the vehicle wheel 109 depresses the wheel trigger 202, overcoming the biasing member 210 and rotating the wheel trigger 202 downwardly and into the chock body 201. When the wheel chock 200 is removed from the vehicle wheel 109, the biasing member 210 returns the wheel trigger 202 to the protruding position shown in FIG. 2.

In the illustrated embodiment, the wheel chock 200 further includes a trigger lock 204 having a blocking surface 205 configured to releasably abut a corresponding engagement surface 203 on the wheel trigger 202. The trigger lock 204 is fixedly coupled to a handle pivot shaft 216, which is in turn fixedly coupled to a handle mount 220 that receives a proximal end portion of the handle 112. The handle pivot shaft 216 is rotatably received in opposing pivot sleeves 218, which are fixedly attached to a rear wall 211 of the chock body 201. A biasing member 222 (e.g., a helical torsion spring) extends around the pivot shaft 216 and operably coupled between the handle mount 220 and the rear wall 211. The biasing member 222 is preloaded to provide a torsional force against the handle mount 220 that biases the handle 112 and the trigger lock 204 in a downward and forward direction toward the wheel trigger 202. As described in greater detail below, rearward rotation of the handle 112 beyond the upright position shown in FIG. 2 is prevented by the trigger lock 204, which abuts the rear wall 211 of the chock body 201. However, the handle 112 is free to rotate downwardly and forward from the position shown when the wheel trigger 202 is rotated upwardly to the protruding position so that it does not block the forward rotation of the trigger lock 204.

As FIG. 2 illustrates, the sensor target 114 can be fixedly attached to the handle mount 220 such that it faces toward the dock face 106 (FIG. 1A). In the illustrated embodiment, the sensor target 114 can have a length of from about 2 inches to about 18 inches, or about 4 inches to about 10 inches, or about 7 inches, and a width of from about 0.5 inch to about 3 inches, or about 1 inch to about 2 inches, or about 1.6 inches. In other embodiments, the sensor target 114 can have other shapes, sizes, and/or placements on the wheel chock assembly 110.

FIGS. 3A-3C are a series of side views illustrating stages of a method for installing the wheel chock 200 in a blocking position against the vehicle wheel 109, in accordance with an embodiment of the present technology. Referring first to FIG. 3A, in this view the wheel chock assembly 110 is configured as it would be when stowed in the storage cradle 131 (FIG. 1A). More specifically, in the storage configuration the handle 112 is rotated (in the clockwise direction in FIG. 3A) to a lowered position by the biasing member 222 (FIG. 2). In this position, a step 312 on the trigger lock 204 abuts an arcuate outer surface 310 of the wheel trigger 202 to prevent further clockwise rotation of the handle 112. With the wheel trigger 202 and the trigger lock 204 engaged in the foregoing manner, the handle 112 is disposed in its lowered position and the wheel trigger 202 is held in the fully extended position in which the wheel contact surface portion 226 protrudes outwardly from the blocking surface 207 of the chock body 201. As described in greater detail below, when the wheel chock assembly 110 is in this configuration, the vehicle driver, or other dock personnel, can grasp the handle grip 113 (FIGS. 1A and 1B) to remove the wheel chock assembly 110 from the storage cradle 131 and carry the wheel chock assembly 110 over to the vehicle wheel 109.

Turning next to FIG. 3B, in the illustrated embodiment, when the handle 112 is held in the vertical position shown, the wheel chock 200 autorotates downwardly relative to the handle 112 by virtue of its weight to the orientation shown. In FIG. 3B, the wheel chock 200 has been positioned on the driveway 104 directly in front of the tread of the vehicle wheel 109. In this configuration, the rotation of the wheel chock 200 downwardly about the pivot shaft 216 relative to the handle 112 moves the blocking surface 205 of the trigger lock 204 away from the engagement surface 203 of the wheel trigger 202. As shown in FIG. 3C, this provides clearance between the trigger lock 204 and the outer surface 310 of the wheel trigger 202, so that the wheel trigger 202 can rotate downwardly (in the counterclockwise direction) about the pivot shaft 206 as the wheel chock 200 is pushed into position against the vehicle wheel 109 and the treaded surface of the vehicle wheel 109 depresses the wheel trigger 202. When the wheel trigger 202 is held in the depressed position shown in FIG. 3C, the arcuate outer surface 310 of the wheel trigger 202 is positioned in a blocking relationship relative to a complementary arcuate surface 306 of the trigger lock 204. As a result, the handle mount 220 and the corresponding handle 112 are prevented from rotating downwardly, thereby maintaining the sensor target 114 in a perpendicular, or at least approximately perpendicular, position relative to the light beam 133 emitted from the sensor 132 (FIG. 1A). Accordingly, the structure and function of the wheel chock assembly 110 described above ensures that the wheel chock 200 is properly positioned against the vehicle wheel 109 for the sensor target 114 to be positioned in a reflective orientation relative to the sensor 132, so that the sensor 132 can confirm the proper placement of the wheel chock 200. For example, if the wheel chock 200 is moved away from the vehicle wheel 109 and the handle 112 is not being held, then the handle 112 will rotate downwardly to the position shown in FIG. 3A and the sensor target 114 will not be in a reflective orientation relative to the sensor 132.

FIG. 4A is a partially schematic front isometric view of the base unit 130 configured in accordance with an embodiment of the present technology, FIGS. 4B and 4C are side views illustrating stages of storing the wheel chock assembly 110 in the storage cradle 131, and FIG. 4D is a front elevation view of the wheel chock assembly 110 stored in the storage cradle 131 in accordance with an embodiment of the present technology. Referring first to FIGS. 4A and 4D, the base unit 130 can include a mounting flange 430 that is fixedly attached (via, e.g., suitable anchor bolts) to the dock face 106 below and adjacent to the loading dock opening 103. In the illustrated embodiment, the sensor 132 is mounted to a sidewall 432 of the storage cradle 131. The sensor 132 is positioned slightly outboard of the sidewall of the vehicle wheel 109 (e.g., from about 0.5 inch to about 8 inches outboard, or from about 0.5 inch to about 5 inches outboard) so that it will be vertically and laterally aligned (or at least approximately vertically and laterally aligned, or otherwise suitably aligned) with the sensor target 114 (as shown in FIG. 1C) when the wheel chock assembly 110 has been properly placed against the vehicle wheel 109 in a blocking relationship. The indicator light 134 described above with reference to FIG. 1A can be mounted to a lower front portion of the storage cradle 131, so that it can be easily viewed by the vehicle driver or other dock personnel as a visual indication that the wheel chock assembly 110 has been properly placed against the vehicle wheel 109. The storage cradle 131 and other portions of the base unit 130 can be manufactured from suitable metallic materials, such as plate steel that is cut and welded or otherwise assembled together (e.g., bolted).

Referring next to FIGS. 4B and 4C, in the illustrated embodiment the storage sensor 136 can be mounted to a wall (e.g., a base wall 434) of the storage cradle 131. This enables the storage sensor 136 to detect the presence of the wheel chock 200 when the wheel chock assembly 110 has been properly stowed in the storage cradle 131, as shown in FIG. 4C. When stored in this manner, the storage sensor 136 sends a corresponding signal to the controller 150 indicating that the wheel chock assembly 110 has been properly returned to the base unit 130.

Figure 5:
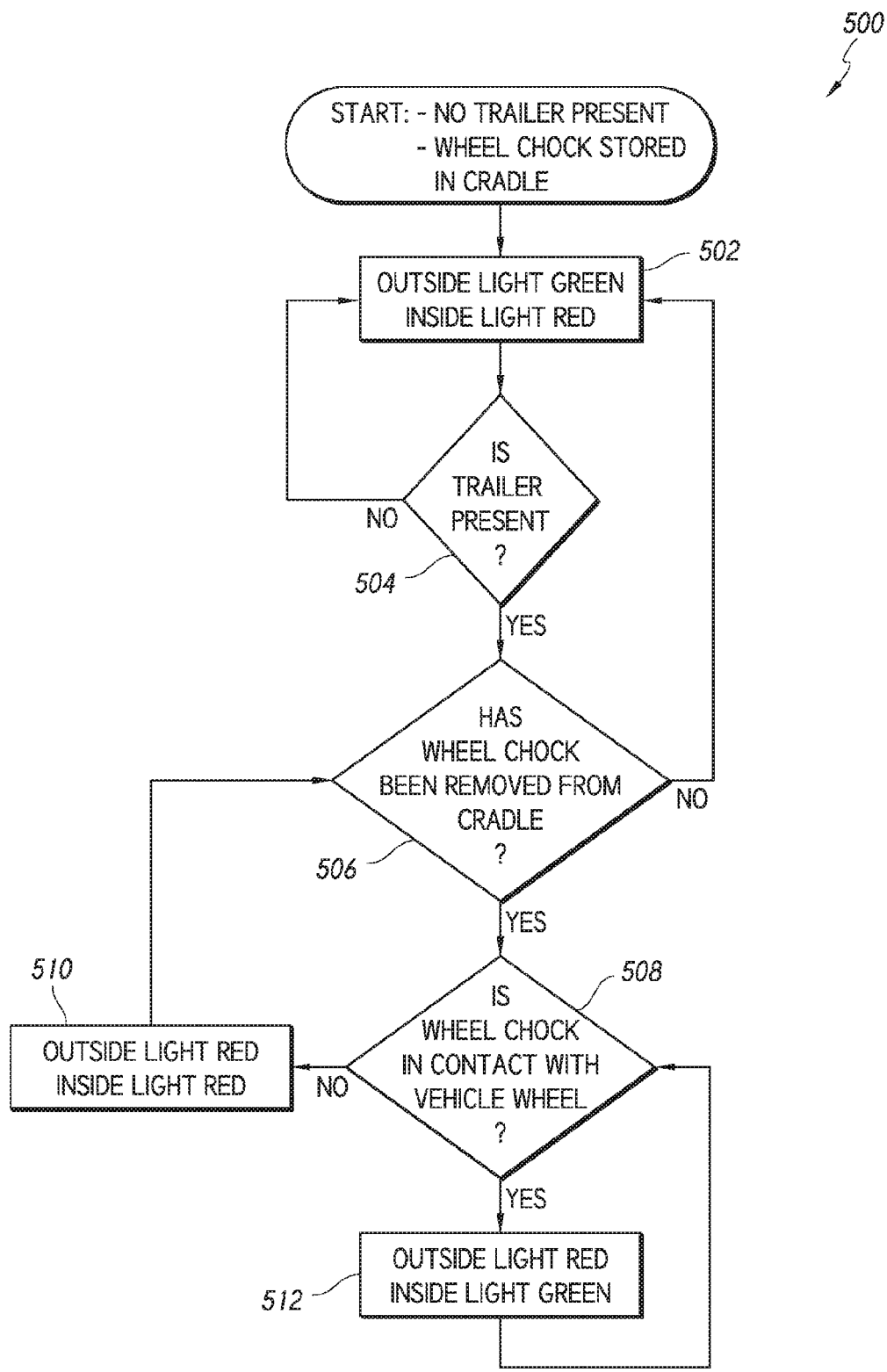
FIG. 5 is a flow diagram of a routine for operating a wheel chock and associated signal light system in accordance with an embodiment of the present technology.
Figure 6:
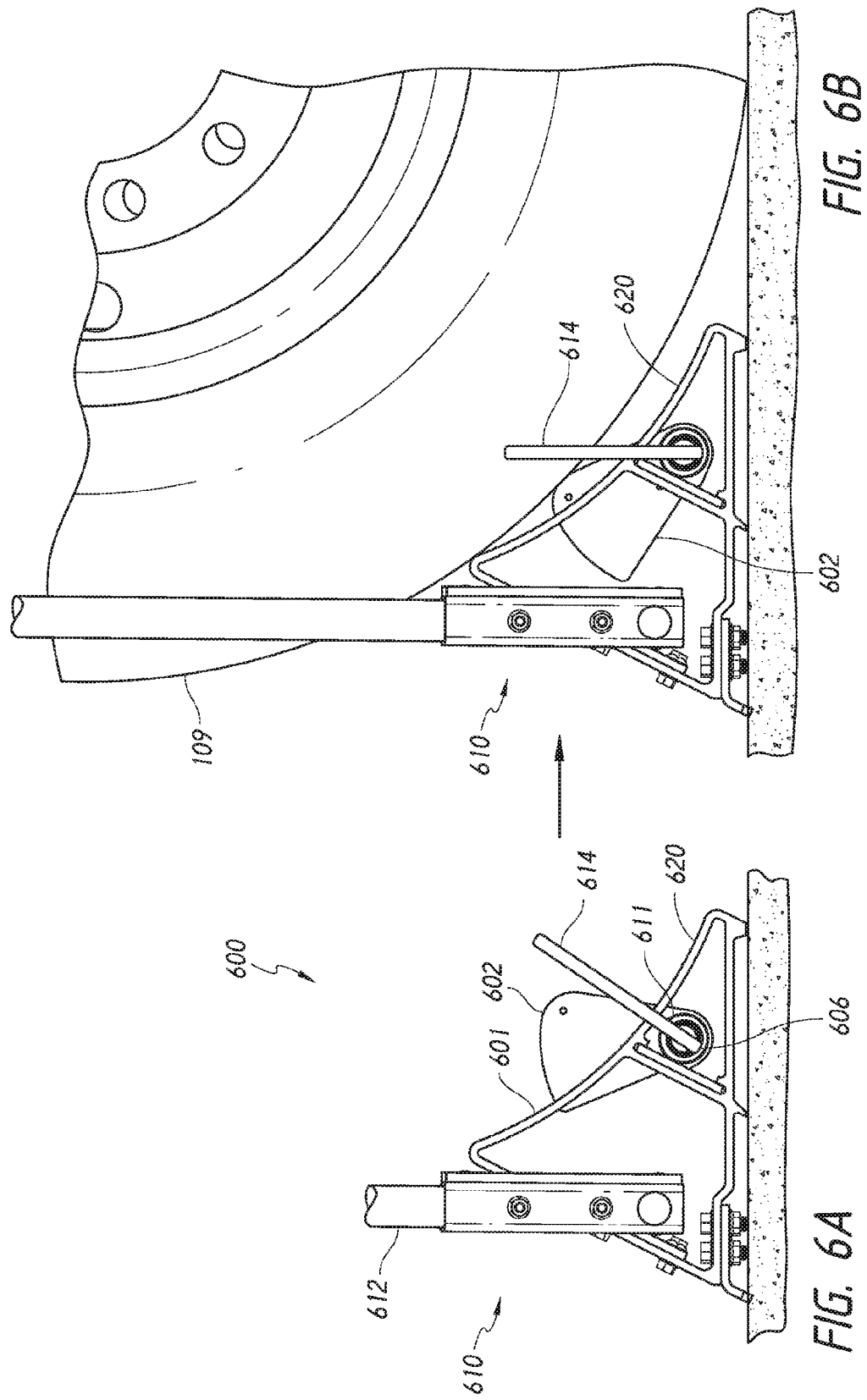
FIGS. 6A and 6B are side elevation views illustrating two stages of operation of a wheel chock assembly configured in accordance with another embodiment of the present technology.

FIG. 5 is a flow diagram of a routine 500 for use of the wheel chock system 100 (FIG. 1A) in accordance with an embodiment of the present technology. All or portions of the routine 500 can be executed by the controller 150 (FIG. 1A) in accordance with computer-readable instructions stored on associated memory. Referring to FIGS. 1A-5 together, the routine 500 begins when no trailer is present at the loading dock 102 and the wheel chock assembly 110 is stored in the storage cradle 131. In some embodiments, the presence of a trailer or other shipping vehicle at the loading dock 102 can be detected by a proximity sensor (not shown) mounted on or proximate to the loading dock face or driveway. The presence of the wheel chock assembly 110 in the storage cradle 131 can be confirmed by the storage sensor 136. In block 502, the routine activates (i.e., illuminates) the green light 164b on the outside signal light assembly 160, and the red light 166a on the inside signal light assembly 162. The outside green light 164b indicates to vehicle drivers and/or dock personnel that the loading dock 102 is empty, and the inside red light 166a indicates that a trailer is not present at the loading dock 102 and, therefore, the loading dock door should not be raised. In decision block 504, the routine determines if a trailer is present at the loading dock 102. As noted above, the presence of a trailer can be detected by a proximity sensor or other suitable means. If a trailer is not present, the routine returns to block 502 and maintains the outside and inside signal lights in their current state. Conversely, if a trailer is present at the loading dock 102, the routine proceeds to decision block 506 to determine if the wheel chock assembly 110 has been removed from the storage cradle 131. If not, the routine returns to block 502 and maintains the outside and inside signal lights in their current state.

If the wheel chock assembly 110 has been removed from the storage cradle 131 in decision block 506, the routine proceeds to decision block 508 to determine if the wheel chock assembly 110 has been positioned in a blocking relationship relative to a vehicle wheel (e.g., the vehicle wheel 109). As described in detail above, in some embodiments the routine detects proper placement of the wheel chock assembly 110 by means of the sensor 132 and the sensor target 114. More specifically, when the wheel chock assembly 110 has been removed from the storage cradle 131, the controller 150 energizes or otherwise sends an operating command signal to the sensor 132, which causes the sensor 132 to emit the light beam 133 outward from the dock face 106. When the wheel chock assembly 110 has been properly positioned against the vehicle wheel 109, the sensor target 114 reflects the light beam 133 (or a portion thereof) back to the sensor 132, which receives the reflected light and sends a corresponding signal to the controller 150, thereby confirming proper placement of the wheel chock assembly 110. In some embodiments, the routine can confirm proper placement of the wheel chock assembly 110 when the sensor 132 has sustained contact with the sensor target 114 for a preset minimum period of time, such as from about 2 seconds to about 10 seconds, or about 5 seconds.

If the wheel chock is not in contact with the vehicle wheel, the routine proceeds to block 510 and activates the outside red light 164a while deactivating (i.e., extinguishing) the outside green light 164b, and maintains activation of the inside red light 166a. The illuminated outside red light 164a indicates to the vehicle driver and/or other dock personnel that the vehicle should not be moved (so that the wheel chock assembly 110 can be positioned against the vehicle wheel 109). The illuminated inside red light 166a continues to indicate to dock personnel that the vehicle has not been properly restrained at the loading dock and, accordingly, the loading dock door and/or an associated barrier gate should not be raised. After block 510, the routine returns to decision block 506 and repeats.

If the wheel chock assembly 110 has been properly positioned in contact with the vehicle wheel 109, the routine proceeds from decision block 508 to block 512 and activates the outside red light 164a while deactivating the outside green light 164b, and activates the inside green light 166b while deactivating the inside red light 166a. As noted above, the illuminated outside red light 164a indicates to the vehicle driver and/or other dock personnel that the vehicle should not be moved (because it is restrained by the wheel chock assembly 110). In addition, the indicator light 134 (FIG. 1A) is activated to indicate that the wheel chock assembly 110 is properly positioned. The illuminated green light 166b inside the loading dock indicates to the dock operator and/or other dock personnel that the vehicle has been properly restrained and, accordingly, the loading dock door (and/or an associated barrier gate) can be raised and a dock leveler extended into the trailer for loading and/or unloading.

After block 512, the routine returns to decision block 508 to confirm that the wheel chock assembly 110 is still in a blocking relationship relative to the vehicle wheel 109. When the vehicle unloading/loading process is complete, dock personnel can remove the dock leveler from the trailer and lower the loading dock door. The vehicle driver or other dock personnel can then remove the wheel chock assembly 110 from the vehicle wheel 109 and return the wheel chock assembly 110 to the storage cradle 131. When this happens, the routine proceeds to block 510 and activates both the outside red light 164a and the inside red light 166a as described above. Then the routine returns to decision block 506 to determine if the wheel chock assembly 110 is still removed from the storage cradle 131. If not (i.e., the wheel chock assembly 110 has been returned to the storage cradle 131) the routine returns to block 502 and activates the outside green light 164b and extinguishes the outside red light 164a, while activating the inside red light 166a and extinguishing the inside green light 166b. The outside green light 164b indicates to the vehicle driver that the vehicle can be moved away from the loading dock, and the inside red light 166a indicates to dock personnel that the loading dock door should not be raised.

Although the routine 500 describes how the wheel chock system 100 can be used in accordance with some embodiments of the present technology, in other embodiments the wheel chock system 100 and/or various portions thereof can be used in other operational sequences without departing from the spirit or scope of the present disclosure. For example, in some embodiments the controller 150 can be operably connected to other loading dock components to control their operation based on whether or not the vehicle has been properly restrained at the loading dock. For instance, in some embodiments the controller 150 can be operably connected to a dock leveler, a loading dock door, a dock barrier gate, and/or other loading dock hardware to interlock this equipment or otherwise prevent its use in an appropriate manner if a vehicle has not been properly restrained at the loading dock by the wheel chock assembly 110. Additionally, although a signal light system has been described herein, in other embodiments other types of signal systems, including other types of visual signal systems, audible alarm systems, etc. can be used with the wheel chock systems described herein to communicate vehicle restraint status to vehicle drivers and dock personnel. Additionally, the controller 150 can be operably coupled to a central loading dock management system to communicate the status of vehicle restraints at a plurality of loading docks at the facility.

FIG. 5 is a representative flow diagram that depicts processes used in some embodiments. The flow diagram does not show all functions or exchanges of data, but instead provides an understanding of commands and data exchanged between the controller 150 and the sensors, lights, loading dock equipment, etc. of the loading dock system 100. Those skilled in the relevant art will recognize that some functions or exchange of commands and data may be repeated, varied, omitted, or supplemented, and other (less important) aspects not shown may be readily implemented. While processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Each of the steps depicted in FIG. 5 can itself include a sequence of operations that need not be described herein. While many of the embodiments shown and described can be implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client. The routine 500 is preferably stored in non-volatile memory (not shown) that forms part of the controller 150, or can be stored in removable media, such as disks, or hardwired or preprogrammed in chips. Those of ordinary skill in the art can create source code, microcode, program logic arrays or otherwise implement the invention based on the flow diagram of FIG. 5 and the detailed description provided herein. Additionally, those or ordinary skill in the art will recognize that a microprocessor-based system could also be used where any logical decisions are configured in software.

Although the wheel chock system 100 described above is one embodiment of a wireless communication system for confirming proper wheel chock placement in accordance with the present technology, in other embodiments, other types of wireless systems can be employed to confirm that a wheel chock has been properly positioned in a blocking relationship to a vehicle wheel to restrain the associated vehicle at a loading dock. FIGS. 6A and 6B, for example, are side elevation views illustrating operation of a wheel chock system 600 configured in accordance with another embodiment of the present technology. Referring first to FIG. 6A, in this embodiment the wheel chock system 600 includes a wheel chock assembly 610 having a wheel chock 620 operably coupled to a handle 612. The wheel chock 620 includes a wheel trigger 602 that is pivotally coupled to a chock body 601 by a pivot shaft 606. A preloaded biasing member 611 (e.g., a torsion spring) is operably coupled between the wheel trigger 602 and the chock body 611, and biases the wheel trigger 602 toward the protruding position shown in FIG. 6A. The chock body 601, the wheel trigger 602, the pivot shaft 606, and the biasing member 611 can be at least generally similar in structure and function to the corresponding structures of the wheel chock 200 described above with reference to FIG. 2. In the illustrated embodiment, however, the wheel chock 620 includes a sensor target 614 (e.g., a reflective target) that is not attached to the handle 612 but instead is fixedly coupled to the pivot shaft 606 just outboard of the chock body 601.

As shown in FIG. 6B, when the wheel chock 620 is properly positioned in a blocking relationship against the vehicle wheel 109, the vehicle wheel 109 depresses the wheel trigger 602, causing it to rotate downwardly into the chock body 601, which in turn rotates the sensor target 614 upwardly via the pivot shaft 606 into a vertical position that is coplanar (or at least approximately coplanar) with the dock face 106 (FIG. 1A). Once in the vertical position shown, the sensor target 614 can interact with the light beam 133 from sensor 132 as described in detail above with reference to FIGS. 1A-1C to confirm that the wheel chock 620 has been properly placed against the vehicle wheel 109. When the operator pulls or otherwise removes the wheel chock 620 from the vehicle wheel 109, the wheel trigger 602 and the sensor target 614 return to their initial positions as shown in FIG. 6A by virtue of the biasing member 611.

In another embodiment similar to the embodiment described above with reference to FIGS. 6A and 6B, the sensor target 614 can be moved to the deployed (e.g., vertical) position shown in FIG. 6B by actuation of the wheel trigger 602, but can remain in the vertical position until being manually reset by an operator grasping the sensor target 614 (or a button, lever, or other structure operably coupled thereto) and physically rotating it to the retracted position shown in FIG. 6A. In a further embodiment, the sensor target 614 (or a similar passive sensor target) could be operably coupled to the handle 612 by a suitable linkage (not shown), and the operator can retract the sensor target 614 by movement of the handle 612. In yet another embodiment, the sensor target 614 can remain in the vertical, operable position shown in FIG. 6B until the wheel chock assembly 610 is placed in the storage cradle 131, which actuates a lever or similar mechanism on the wheel chock 620 (or the storage cradle 131) to return the sensor target 614 to the retracted position shown in FIG. 6A. In a further embodiment, the sensor target 614 (or a similar passive sensor target) may not be automatically activated, but instead can be manually moved to the deployed (e.g., vertical) position by a dock worker or the vehicle driver once the wheel chock assembly 610 has been properly positioned against the vehicle wheel 109. In this embodiment, the sensor target 614 can also be manually retracted once the wheel chock assembly 610 has been removed from the vehicle wheel 109.

Although the sensor targets 114 and 614 described above are moveable with respect to the corresponding chock body, in other embodiments, wheel chocks configured in accordance with the present disclosure can include sensor targets (e.g., the reflective sensor target 614 or a similar sensor target) that are fixedly attached to the chock body (e.g., the chock body 601). In such embodiments, the sensor target remains in the vertical position shown in FIG. 6B relative to the chock body, and is detected by the base sensor (e.g., the sensor 132 in FIG. 1A) whenever the chock body is properly placed in a blocking relationship to a vehicle wheel. As the foregoing discussion illustrates, the present disclosure is not limited to particular structures and systems for mounting and/or deploying sensor targets, but extends to other apparatuses and systems for sensing targets (e.g., reflective sensor targets) to detect when a wheel chock assembly has been properly placed in a restraining relationship against a vehicle wheel.

Figure 7:
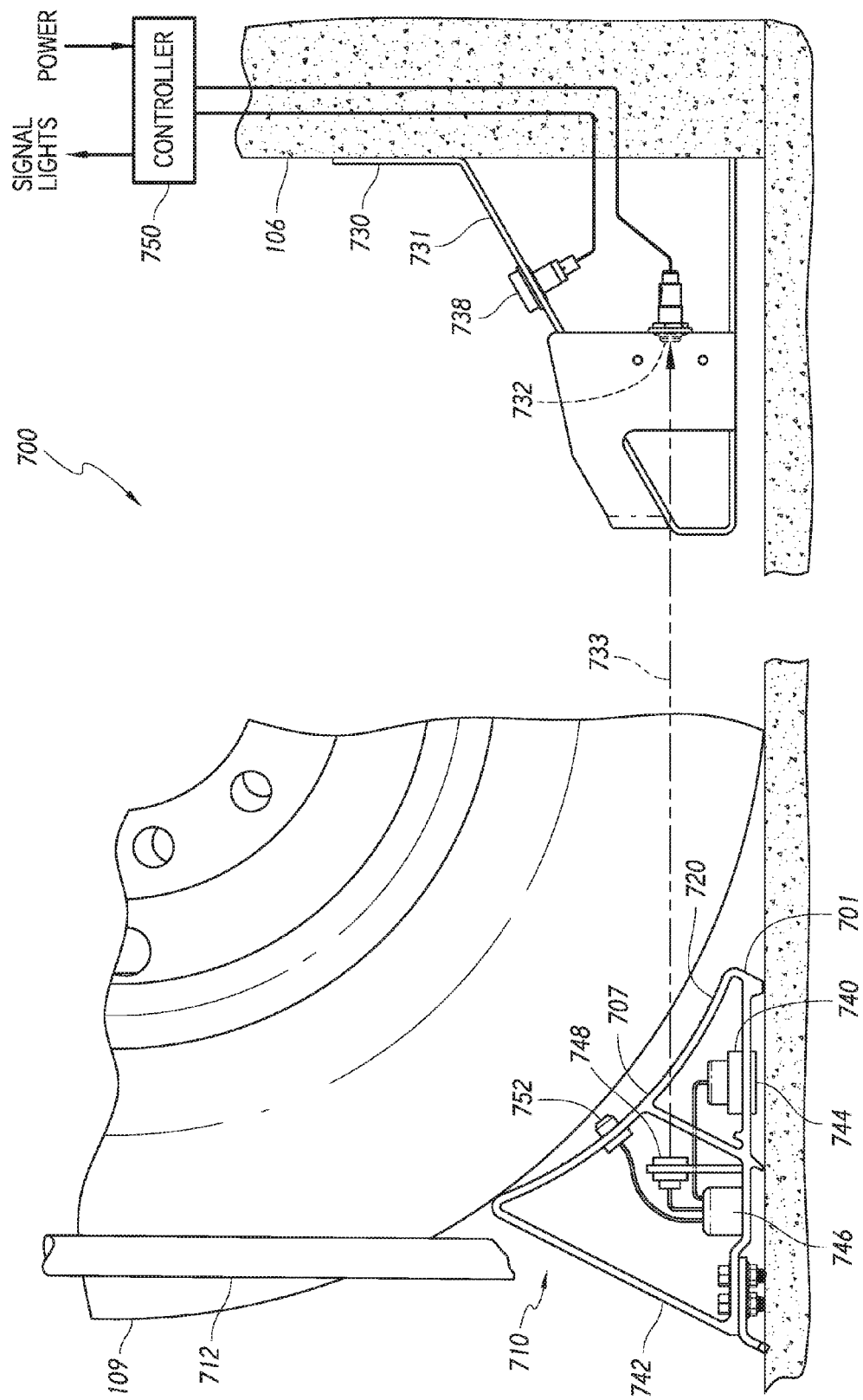
FIG. 7 is a partially schematic side elevation view of a wheel chock system configured in accordance with a further embodiment of the present technology.

FIG. 7 is a partially schematic side elevation view of a wheel chock system 700 configured in accordance with another embodiment of the present technology. In the illustrated embodiment, the wheel chock system 700 includes a wheel chock assembly 710 that restrains the vehicle wheel 109 at the loading dock 102 (FIG. 1A). The wheel chock assembly 710 includes a handle 712 operably coupled to a wheel chock 720. The wheel chock 720 includes a chock body 701 having a wheel contact surface 707. The chock body 701 is at least generally similar in structure and function to the chock body 201 described above with reference to FIG. 2. The wheel chock 720, however, differs from the wheel chock 200 described above. More specifically, rather than include a sensor target for detection by a sensor mounted to the dock face 106 (e.g., the sensor 132), the wheel chock 720 instead includes a wireless transmitter 748 configured to transmit a wireless signal back to a sensor (e.g., a wireless receiver 732) mounted to the dock face 106 and/or otherwise operably connected to a system controller 750 when the wheel chock 720 has been properly positioned against the vehicle wheel 109.

In the illustrated embodiment, the wheel chock 720 carries a power source 740 (e.g., a rechargeable DC battery) having a recharging interface 744 mounted to an outer surface 742 (e.g., a rear wall) of the chock body 701. The power source 740 is electrically connected (e.g., via one or more suitable wires) to a relay 746, which in turn is electrically connected to the transmitter 748 and a wheel sensor 752. The wheel sensor 752 is mounted to the contact surface 707, and is configured to detect the presence of the vehicle wheel 109 when the vehicle wheel 109 is in contact with (or at least very near) the wheel chock 720. For example, in some embodiments the wheel sensor 752 can be a suitable proximity sensor known in the art, such as an ultrasonic sensor, a photoelectric sensor, a capacitive sensor, etc. In other embodiments, the wheel sensor 752 can include an electromechanical switch that is depressed or otherwise activated when the vehicle wheel 109 makes contact with the contact surface 707. In some embodiments, the transmitter 748 can include an RF transmitter for transmitting a Bluetooth, Wi-Fi, or other wireless signal 733 to the receiver 732. In another embodiment, the transmitter 748 and the receiver 732 can be at least generally similar in structure and function to transmitters and receivers used on remote garage door opening systems. For example, in some embodiments the transmitter 748 can be configured to transmit an RF signal at a preset frequency when the vehicle wheel 109 is in contact with the wheel chock 720, and the receiver 732 can be configured to receive and respond to this frequency. In other embodiments, the transmitter 748 can be configured to transmit a multi-frequency RF code, and the receiver 732 can be configured to receive and respond to the code.

In a further aspect of this embodiment, the wheel chock system 700 includes a base unit 730 that is fixedly attached to the dock face 106. The base unit 730 can include a wheel chock storage cradle 731 that is at least generally similar in structure and function to the storage cradle 131 described in detail above. Additionally, the storage cradle 731 can include a recharging receptacle 738 that is configured to cooperatively receive and electrically connect to the recharging interface 744 on the wheel chock assembly 710 when the wheel chock assembly 710 is positioned in the storage cradle 731.

More specifically, when the wheel chock assembly 710 is properly positioned in the storage cradle 731 (as shown in FIG. 4C for the wheel chock assembly 110), the power source 740 is recharged with power from the controller 750 via the electrical connection between the recharging interface 744 and the recharging receptacle 738. When the wheel chock assembly 710 is removed from the storage cradle 731 and positioned against the vehicle wheel 109 as shown in FIG. 7, the wheel sensor 752 detects that the wheel chock 720 has been properly positioned in a blocking relationship to the vehicle wheel 109 and transmits a corresponding signal to the relay 746. The relay 746 responds by energizing the transmitter 748 with the power source 740, and the transmitter 748 responds by transmitting a wireless signal 733 (e.g., a Bluetooth, Wi-Fi, and/or other wireless signal) to the receiver 732. Upon receiving the signal, the receiver 732 sends a corresponding signal to the controller 750 to confirm proper placement of the wheel chock assembly 710. The controller 750 can then operate loading dock signal lights (e.g., the signal light assemblies 160 and 162 described above with reference to, for example, FIG. 1A) as described above with reference to, for example, FIG. 5, to ensure safe operation of the loading dock.

In other embodiments, other systems can be used to energize the transmitter 748 and communicate a wireless signal to the receiver 732. For example, in other embodiments a wheel trigger at least generally similar to the wheel trigger 202 or 602 described above with reference to FIGS. 2, 6A, and 6B can be operably coupled to an electrical generator carried by the wheel chock that converts the mechanical energy from movement of the wheel trigger 202 or 602 into electrical current when the wheel trigger is depressed by the vehicle wheel. This electrical power can then be used to energize the transmitter 748 to transmit a corresponding signal back to the base unit 730 to confirm that the wheel chock has been properly positioned against the vehicle wheel 109.

In yet other embodiments, the transmitter 748 can be replaced by a wireless identifier, such as a low-cost, passive RFID transponder or RFID "tag" (for example, an EM4100 or EM4102 compatible RFID transponder), and the receiver 732 can be replaced by a suitable RFID reader. As is known, RFID tags can include an integrated circuit (IC) and a corresponding antenna. In the case of passive RFID tags, the tag does not contain a battery or other power source, and may be considered "low frequency" (e.g., 125/134 kHz) for use with "read-only" RFID readers. The RFID tag on a wheel chock is activated by an electromagnetic field generated by the RFID reader mounted to, for example, the base unit 730, and the tag circuit responds by sending information (e.g., 64 bits of information contained in a programmed memory array) back to the RFID reader when the wheel chock has been properly positioned in a blocking relationship to the vehicle wheel. The RFID reader can be a wireless reader, such as a 125 kHz EM4100 or EM4102 RFID reader module in a printed circuit board (PCB) form factor with a USB port for reading EM4100 or EM4102 compatible tags. The reader can include an RF transceiver for wireless communication with the RFID tag on the wheel chock, and the transceiver can be controlled by a microprocessor and/or digital signal processor mounted to the base unit 730.

Figure 8:
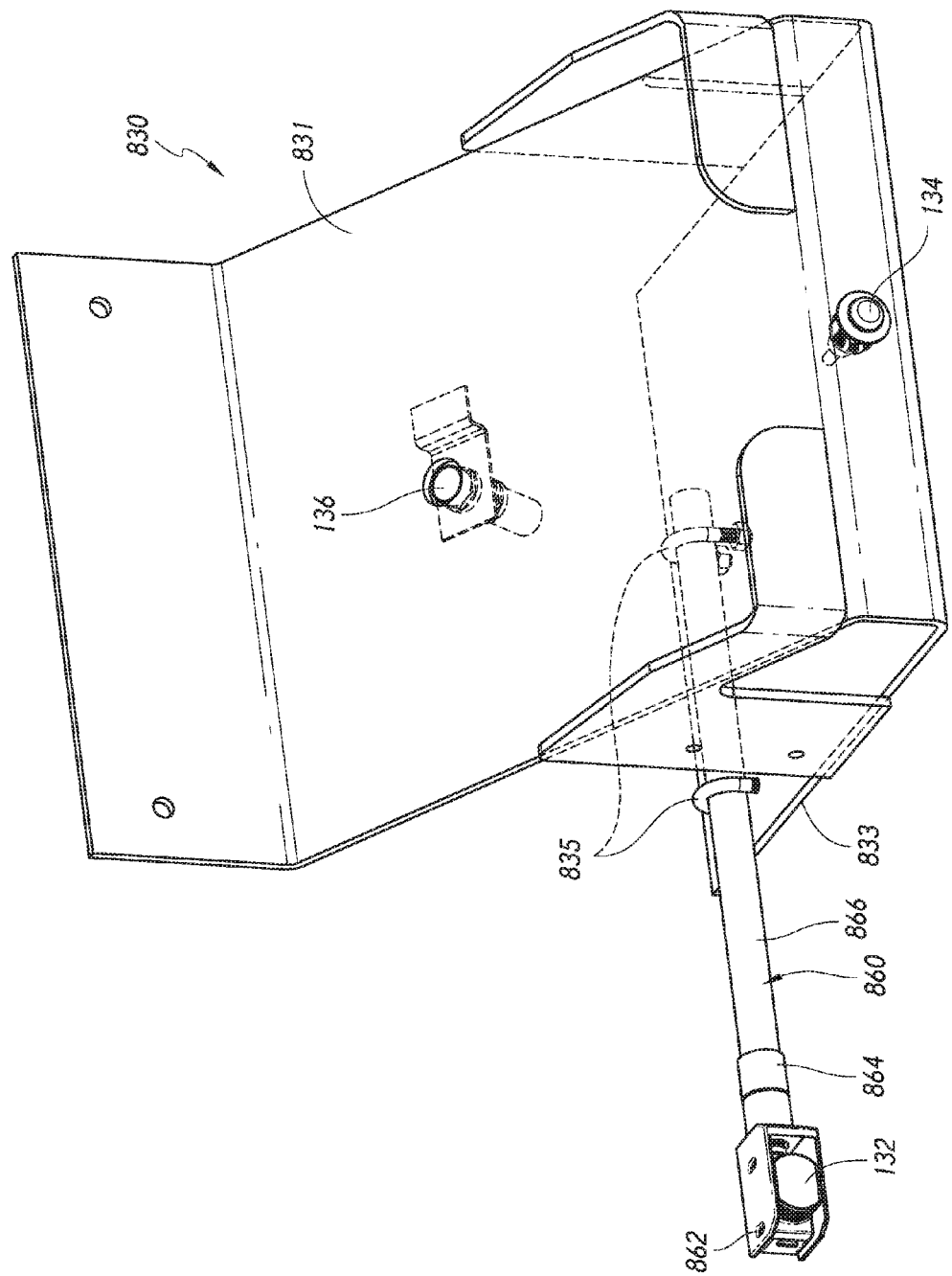
FIG. 8 is a front isometric view of a wheel chock storage cradle having an adjustable sensor mounting apparatus configured in accordance with an embodiment of the present technology.

FIG. 8 is a front isometric view of a base unit 830 having a wheel chock storage cradle 831 configured in accordance with another embodiment of the present technology. The wheel chock storage cradle 831 carries the indicator light 134 and the storage sensor 136, and is at least generally similar in structure and function to the wheel chock storage cradle 131 described in detail above. In the illustrated embodiment, however, the storage cradle 831 also carries an adjustable sensor mounting apparatus 860. The sensor mounting apparatus 860 includes an arm 866 (e.g., an elongate round tube) that extends outwardly from one side of the storage cradle 831 and is adjustably secured to a lower surface 833 thereof by two clamps 835. The sensor 132 is carried in a housing 862 that is secured to a distal end of the arm 866 by an adjustable clamp 864. The mounting apparatus 860 enables the lateral position of the sensor 132 (i.e., the horizontal position relative to the storage cradle 831), and the line of sight of the sensor 132 in the vertical plane to be adjusted during installation to enhance alignment of the sensor 132 with a target (e.g., the target 114) to optimize, or at least enhance, operational performance of the chock detection system. For example, the lateral position of the sensor 132 can be adjusted by sliding the arm 866 toward or away from the storage cradle 831 as needed and then tightening the clamps 835. To adjust the line of sight of the sensor 132, the clamp 864 can be loosened and the housing 862 rotated about the longitudinal axis of the arm 866 until the sensor 132 is positioned at the desired angle. The clamp 864 can then be tightened to retain the sensor 132 in the desired position. Alternatively, the line of sight of the sensor 132 can also be adjusted by using a similar process with the clamps 835.

As those of ordinary skill in the art will appreciate, embodiments of the wireless wheel chock systems described herein are less complex and easier to use than conventional wheel chock systems that require electrical cables extending between the wheel chock and the building. Additionally, embodiments of the present technology do not require the complexity of embedding mechanical vehicle restraints in the loading dock driveway or mounting such systems to the dock face, and can offer other advantages such as reduced storage volume and greater reliability over prior systems.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages and similar language throughout this specification may, but do not necessarily, refer to the same embodiment.

While the above detailed description describes various embodiments of the invention and the best mode contemplated, regardless of how detailed the above text, the invention can be practiced in many ways. Details of the system may vary considerably in its specific implementation, while still being encompassed by the present disclosure. The above detailed description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further, any specific numbers noted herein are only examples; alternative implementations may employ differing values or ranges.

Any patents and applications and other references identified herein, including any that may be listed in accompanying filing papers, are incorporated herein by reference in their entirety. Aspects of the invention can be modified, if necessary, to employ the systems, functions, and concepts of the various references described above to provide yet further implementations of the invention.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A wireless wheel chock system comprising:
a portable wheel chock assembly, the wheel chock assembly including
a wheel chock positionable in contact with a wheel of a vehicle; and
a sensor target coupled to the wheel chock; and
a sensor configured to wirelessly detect the sensor target, wherein the wheel chock is configured to be spaced apart from the sensor, and wherein the sensor is configured to wirelessly detect the sensor target when the wheel chock is spaced apart from the sensor and positioned in contact with the wheel of the vehicle to restrict movement of the vehicle.

2. The wheel chock system of claim 1 wherein the sensor target is a nonelectrical device.

3. The wheel chock system of claim 1 wherein the sensor is configured to detect the sensor target by detecting electromagnetic radiation from the sensor target.

4. The wheel chock system of claim 1 wherein the sensor target includes a reflective portion, and wherein the sensor is configured to detect the sensor target by detecting electromagnetic radiation reflected by the reflective portion.

5. The wheel chock system of claim 1 wherein the sensor is configured to detect the sensor target by detecting radio waves emitted from the sensor target.

6. The wheel chock system of claim 1 wherein the sensor is a retroflective sensor that includes an emitter and a receiver, and wherein the sensor is configured to detect the sensor target by emitting a light beam from the emitter that is reflected off of the sensor target, and receiving at least a portion of the reflected light beam by the receiver.

7. The wheel chock system of claim 1 wherein the wheel chock system is useable at a loading dock, wherein the loading dock includes a dock face adjacent to an opening in a building for accessing a shipping vehicle parked at the loading dock, and wherein the sensor is fixedly attached relative to the dock face.

8. The wheel chock system of claim 1 wherein the wheel chock system is useable at a loading dock, wherein the loading dock includes a dock face adjacent to an opening in a building for accessing a shipping vehicle parked at the loading dock, and wherein the wheel chock system further comprises:
a wheel chock storage cradle structure mounted to the dock face, wherein the sensor is fixedly mounted to the storage cradle structure.

9. The wheel chock system of claim 1 wherein the sensor target is movable relative to the wheel chock between a stored position and a deployed position.

10. The wheel chock system of claim 1 wherein the sensor target is movable relative to the wheel chock from a first position in which the sensor target is undetectable by the sensor to a second position in which the sensor target is detectable by the sensor, and wherein positioning the wheel chock in contact with the wheel of the vehicle retains the sensor target in the second position.

11. The wheel chock system of claim 1 wherein the sensor target is movable relative to the wheel chock from a first position in which the sensor target is undetectable by the sensor to a second position in which the sensor target is detectable by the sensor, and wherein the wheel chock assembly further comprises a wheel trigger configured to retain the sensor target in the second position in response to placement of the wheel chock against the wheel of the vehicle.

12. The wheel chock system of claim 11 wherein the wheel chock includes a contact surface configured to abut the wheel of the vehicle, wherein the contact surface includes an opening through which a portion of the wheel trigger movably extends, and wherein the wheel trigger is configured to retract into the opening in response to placement of the wheel of the vehicle against the wheel trigger.

13. The wheel chock system of claim 1 wherein the wheel chock assembly further comprises a handle to facilitate manual movement of the wheel chock into contact with the wheel of the vehicle, and wherein the sensor target is mounted to the handle.

14. The wheel chock system of claim 1 wherein the wheel chock assembly further comprises:

a handle movably coupled to the wheel chock and moveable from a stored position to an operating position for placement of the wheel chock against the wheel of the vehicle, wherein the sensor target is operably coupled to the handle, wherein the sensor target is undetectable by the sensor when the handle is in the stored position, and wherein the sensor target is detectable by the sensor when the handle is in the operating position.

15. The wheel chock system of claim 1 wherein the wheel chock assembly further comprises:
   a handle operably coupled to the wheel chock and moveable from a stored position to an operating position for placement of the wheel chock against the wheel of the vehicle, wherein the sensor target is operably coupled to the handle, wherein the sensor target is undetectable by the sensor when the handle is in the stored position, and wherein the sensor target is detectable by the sensor when the handle is in the operating position; and
   a wheel trigger operably coupled to the wheel chock and configured to retain the handle in the operating position in response to placement of the wheel chock against the wheel of the vehicle.

16. The wheel chock system of claim 1, further comprising a signaling device operably connected to the sensor, wherein the signaling device is configured to provide a at least one of a visible signal or an audible signal in response to the sensor detecting that the wheel chock is positioned in contact with the wheel of the vehicle to restrict movement of the vehicle.

17. The wheel chock system of claim 1, further comprising:
   a first signaling device positioned outside the loading dock and operably connected to the sensor; and
   a second signaling device positioned inside the loading dock and operably connected to the sensor, wherein the first and second signaling devices are configured to provide first visible signals to personnel outside the loading dock and inside the loading dock, respectively, in response to the sensor detecting that the wheel chock is positioned in contact with the wheel of the vehicle to restrict movement of the vehicle, and wherein the first and second signaling devices are configured to provide second visible signals, different from the first visible signals, to personnel outside the loading dock and inside the loading dock, respectively, in response to the sensor detecting that the wheel chock is not positioned in contact with the wheel of the vehicle.

18. A vehicle restraint system comprising:
   a portable wheel chock; and
   means for wirelessly detecting placement of the portable wheel chock, wherein the portable wheel chock is configured to be spaced apart from the means for wirelessly detecting and placed in contact with a vehicle wheel to restrict movement of the vehicle, and wherein the means for wirelessly detecting is configured to wirelessly detect placement of the wheel chock when the wheel chock is positioned in contact with the vehicle wheel.

19. The vehicle restraint system of claim 18 wherein the portable wheel chock is configured to be placed in contact with the vehicle wheel to restrict movement of the vehicle away from a loading dock, and wherein the means for wirelessly detecting placement of the portable wheel chock includes an optical sensor mounted proximate to the loading dock.

20. The vehicle restraint system of claim 18 wherein the portable wheel chock is configured to be placed in contact with the vehicle wheel to restrict movement of the vehicle away from a loading dock, and wherein the means for wirelessly detecting placement of the portable wheel chock includes a wireless transmitter carried by the portable wheel chock and a wireless receiver mounted proximate to the loading dock.

* * * * *